(12) United States Patent
Sumida

(10) Patent No.: US 10,250,050 B1
(45) Date of Patent: Apr. 2, 2019

(54) ELECTRIC POWER CHARGER WITH EDGE OUTLET

(71) Applicant: E-filliate, Inc., Rancho Cordova, CA (US)

(72) Inventor: Wesley K. Sumida, Fair Oaks, CA (US)

(73) Assignee: E-filliate, Inc., Rancho Cordova, CA (US)

( * ) Notice: Subject to any disclaimer, the term of this patent is extended or adjusted under 35 U.S.C. 154(b) by 375 days.

(21) Appl. No.: 14/742,410

(22) Filed: Jun. 17, 2015

Related U.S. Application Data

(60) Provisional application No. 62/013,162, filed on Jun. 17, 2014.

(51) Int. Cl.
*H02J 7/00* (2006.01)

(52) U.S. Cl.
CPC .................. *H02J 7/0044* (2013.01)

(58) Field of Classification Search
CPC ...................................... H02J 7/0044
USPC ......................................... 320/111, 107, 110
See application file for complete search history.

(56) References Cited

U.S. PATENT DOCUMENTS

| | | | | |
|---|---|---|---|---|
| 6,828,756 B2* | 12/2004 | Kinoshita | ............. | H02J 7/0044 320/114 |
| 8,712,482 B2* | 4/2014 | Sorias | .................. | H02J 7/0042 320/111 |
| D741,257 S * | 10/2015 | Sumida | .................. | Y02E 60/12 D13/108 |
| D742,309 S * | 11/2015 | Sumida | .................. | Y02E 60/12 D13/108 |
| 9,379,618 B2* | 6/2016 | Freeman | ................. | H02M 1/10 |
| 2014/0307439 A1* | 10/2014 | Chien | ................... | H02J 7/0042 362/253 |
| 2015/0304518 A1* | 10/2015 | Rodriguez Diaz | | ......................... H04N 1/40056 358/473 |
| 2016/0380545 A1* | 12/2016 | Freeman | ................. | H02M 1/10 363/21.01 |

* cited by examiner

*Primary Examiner* — M Baye Diao
(74) *Attorney, Agent, or Firm* — Heisler & Associate

(57) ABSTRACT

The charger includes a housing with a base wall opposite a face wall. A male electric power plug has prongs which extend from the face wall to connect to an AC power output receptacle. Intermediate walls extend from the base wall to the face wall including a top wall, a bottom wall and a pair of side walls. Lateral edges are located between the intermediate walls. A USB port, a cord, or other power outlet is located along at least one of these lateral edges, and in some embodiments multiple outlets extend from multiple edges. The charger can thus be utilized in one AC power output receptacle within an array of AC power output receptacles without blocking adjacent AC power output receptacles, and provide one or more sources of DC power to power and/or recharge portable electronic devices.

14 Claims, 8 Drawing Sheets

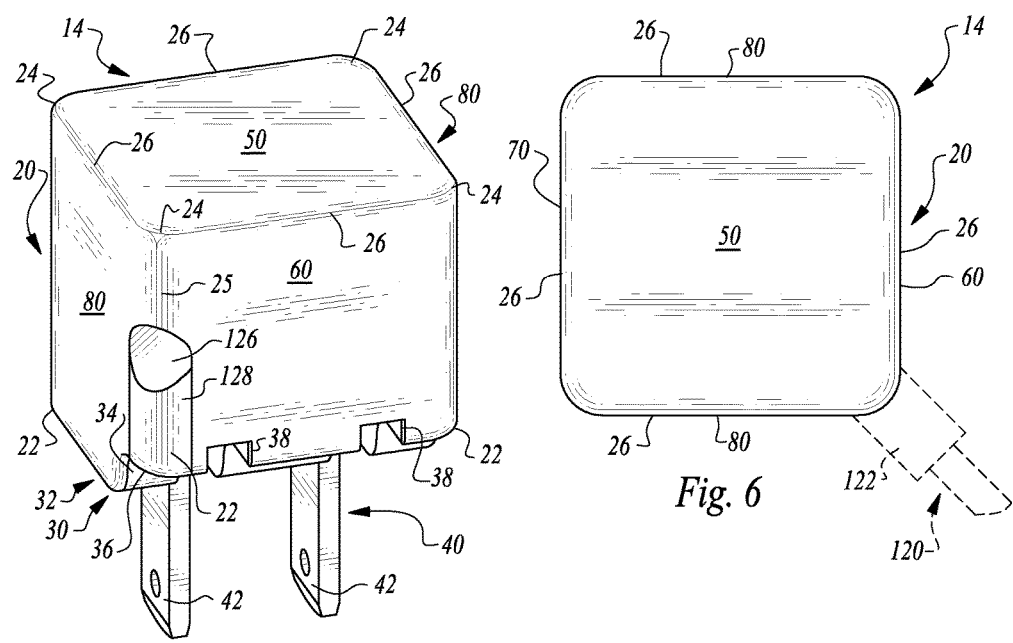
Fig. 5
Fig. 6
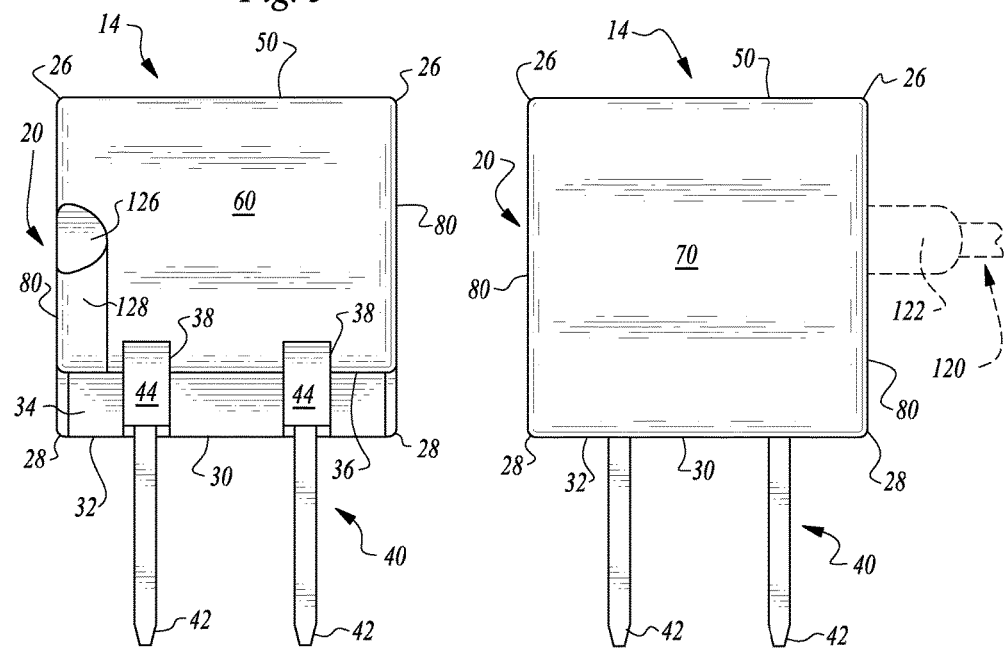
Fig. 7
Fig. 8

US 10,250,050 B1

ELECTRIC POWER CHARGER WITH EDGE OUTLET

CROSS-REFERENCE TO RELATED APPLICATIONS

This application claims benefit under Title 35, United States Code § 119(e) of U.S. Provisional Application No. 62/013,162 filed on Jun. 17, 2014.

FIELD OF THE INVENTION

The following invention relates to AC to DC transformers and particularly such transformers which are configured to plug into an AC electric power output wall receptacle or other standard AC power source and supply power to a portable electronic device or similar device. More particularly, this invention relates to wall charger type transformers which have the transformer within a housing with prongs that extend from the housing for connection to the AC power output receptacle and with an electric pathway leading from the housing, such as in the form of a port for a cord or with a cord built therein, which can feed power to a rechargeable battery powered portable electronic device.

BACKGROUND OF THE INVENTION

A variety of electronic devices are configured to be portable and include a battery therein of a rechargeable variety to supply power to the device. Examples include cell phones, MP3 players, portable computers, tablet computers, electric razors, flashlights and a variety of other portable electronic devices. Such devices generally include a port thereon through which an electric cord can removably attach at a proximal end. This cord is then attached at a distal end to a source of electric power. Most commonly this source of electric power is a wall jack of a standard stationary power outlet, such as that found in a typical residence or other building with electric service (also called an AC power output receptacle herein). Such wall outlets generally include at least two slots into which prongs can be plugged to make an electrical connection to power supplied within such a wall outlet.

Because the electronic devices are battery powered, they are configured to run off of DC electric current. Electric wall power is typically AC. Thus, an adapter is located somewhere in the interconnection between the electronics and the power outlet in the form of a transformer to transform electric power from AC to DC, and also to regulate voltage. Most typically, such a transformer is located at the prong supporting structure at the end of the distal end of the cord opposite the portable electronic device. Often such prong supporting transformer structures (with the cord) are generally referred to as "wall chargers."

Wall chargers come in a variety of different configurations, shapes and styles. While they will sometimes include a third ground plug, they quite often only include two similar prongs of a rectangular cross-section and elongate form spaced and configured to fit into the two slots of the power outlet. This transformer structure is also known in some instances to be removably attachable to the cord, but in other instances to be affixed to the cord permanently. In at least one embodiment, the cord has a coupling on an end thereof which is configured to match to a particular power and data transmission standard, such as the USB standard. The cord is configured with one portion of a male/female USB interconnector and a transformer structure supporting the prongs thereon is configured with the other half of the male/female USB interconnector. In this way, the same cord can be utilized for charging the battery, but can also be plugged into other devices when data transmission is desired.

With the proliferation of portable electronic devices, often an insufficient number of power outlets are available for the number of wall chargers to be connected thereto. A common option when such power outlets are limited, is to utilize a "power strip" or other intermediate device which has one power inlet and multiple power output receptacles. The number of portable electronic devices which can then be charged from a single wall power outlet is thus magnified.

A problem which is encountered with wall chargers, especially when utilizing a power strip, is that the transformer structure which supports the prongs thereon is often so large that when it is used it blocks an adjacent receptacle in the power strip. Furthermore, when a standard power outlet has a pair of receptacles one over the other, a transformer plug mass plugged into the upper receptacle will often block the lower receptacle. Also, transformer structures often have a cord extending downward therefrom which blocks access to a lower one of the receptacles of the wall power outlet or power strip receptacle power outlets. The arrangement of the cord causes interference so that not all of the receptacles of the power outlet or power strip can be utilized.

Accordingly, a need exists for wall chargers which have cord orientations which avoid blocking other power output receptacles or power strip. Such orientations benefit from not being directly away from the plug mass supporting prongs plugged into the power outlet, so that such a cable does not stick further away from a wall to which it is plugged and present interference with desks or other furniture adjacent to the wall or present a risk of being impacted by passersby and potentially becoming unplugged or damaged.

SUMMARY OF THE INVENTION

With this invention, a wall charger for the end of a cord for charging a portable electronic device is provided, which uniquely includes a power outlet therefrom at an edge, rather than from a wall thereof. The wall charger device includes an outer shell/housing which is generally in the form of a cube. This outer shell thus includes a base wall opposite a face wall. The base wall and face wall are preferably substantially parallel to each other and each include four sides. Four intermediate side walls join the base wall to the face wall, with the side walls substantially perpendicular to both the base wall and the face wall. The four side walls are joined to each other at intermediate/side edges. The four side walls are joined to the base wall at base edges. The four side walls are joined to the face wall at face edges.

Four base corners define junctions between the base wall and two adjacent side walls. Four face corners define junctions between the face wall and two adjacent side walls. The walls are preferably substantially flat but not necessarily perfectly flat. The edges are preferably rounded for the intermediate/side edges but close to abrupt and sharp edges for the base edges and face edges. However, such geometric details could be swapped or exchanged. The included figures depict the general relationship of the walls, edges and corners of the outer shell in various embodiments of the wall charging device according to this invention.

Importantly, a cord (fixed or removable) extends from this outer shell, not from one of the walls, but rather from one of the intermediate/side edges. Interior conductors within the cord are coupled to interior electronic circuitry, generally including electronics conforming to the standard to which the cord and portable electronic device is conforming (i.e. a USB standard or other power standard), as well as transformer electronics to convert AC power to DC power of desired voltage, before sending DC power through the cord to the portable electronic device for battery recharging.

The cord preferably extends along a line spaced between the face wall and the base wall so that it extends generally perpendicularly away from the edge to which it is attached. In such an orientation, when the prongs which extend from the base wall of the outer shell are plugged into power output receptacles, the cord extends diagonally and leaves adjacent wall power output receptacles or power strip receptacles unobstructed. The prongs most preferably are pivotably attached to the base wall. In this way, the prongs can be collapsed when the outer shell is being stored, but can be pivoted out and deployed for use when desired.

In one alternative embodiment, rather than having the cord attached to the side edge, a USB port is provided in the side edge. This USB port has a generally rectangular form with a greater length dimension oriented along the edge and extending between the base wall and the face wall. The cord is of a type with the end of the cord adjacent the transformer/prong supporting mass fitted with an appropriate standard USB connector for fitting into the USB port in a removable fashion.

In a further embodiment, a pair of USB ports are provided at separate edges of the outer shell. While various different edges could be utilized, in the embodiment shown, the two edges are adjacent edges. In other embodiments, three or four of the intermediate/side edges could each be fitted with a USB port and conceivably also the face edges. With multiple such ports, multiple portable electronic devices which conform to the USB standard through their cord, can be plugged into a single wall charger plug mass for charging of the multiple portable electronic devices simultaneously.

OBJECTS OF THE INVENTION

Accordingly, a primary object of the present invention is to provide a charger for portable electronic devices or similar devices which supplies DC power to the device when coupled to an AC power source.

Another object of the present invention is to provide a charger for a portable electronic device which can recharge batteries within the portable electronic device from a standard AC electric power receptacle.

Another object of the present invention is to provide a charger with a transformer built thereinto which avoids blocking adjacent power output receptacles when plugged into one power output receptacle.

Another object of the present invention is to provide a charger which transforms AC currents into DC current and which can have a USB plug connected thereinto, so that the charger can use cords provided with a portable electronic device.

Another object of the present invention is to provide a charger for a portable electronic device which can have multiple USB cords plugged thereto simultaneously and with power outlets for receipt of the USB cords oriented to avoid blocking adjacent power output receptacles.

Another object of the present invention is to provide a method for converting AC power to DC power, such as for portable electronic device recharging which avoids blocking adjacent AC power output receptacles when plugged into an AC power output receptacle.

Other further objects of the present invention will become apparent from a careful reading of the included drawing figures, the claims and detailed description of the invention.

BRIEF DESCRIPTION OF THE DRAWINGS

FIG. 5 is a perspective view of a further alternative embodiment of that which is shown in FIG. 1 configured to receive a fixed cord coupled to a housing thereof and with prongs of a male electric power plug shown pivoted to a deployed position.

FIGS. 6-9 are various orthogonal views of that which is shown in FIG. 5, from different viewpoints.

DESCRIPTION OF THE PREFERRED EMBODIMENT

Figure 1:
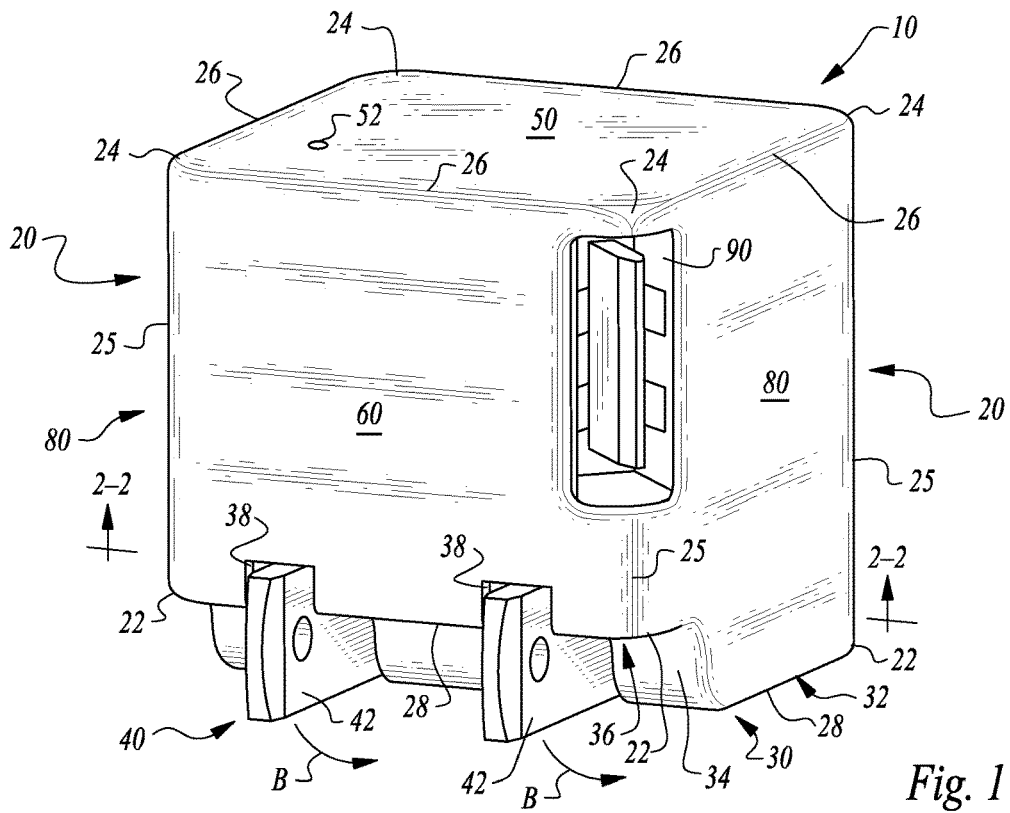
FIG. 1 is a perspective view of a charger according to one embodiment of this invention, including a single USB power outlet located along a lateral edge of a housing of the charger.

Referring to the drawings, wherein like reference numerals represent like parts throughout the various drawing figures, reference numeral 10 (FIG. 1) is directed to a charger in an embodiment featuring a single USB port 90. In an alternative embodiment, a pair of USB ports 90, 110 (FIG. 3) are provided (with additional USB ports also providable). In another alternative embodiment, a built-in cord extends from a housing 20 of the charger 10. The housing 20 of the charger 10 has the USB ports 90, 110 (or cable 120) located at lateral edges 25 so that the USB port or cord providing power output is conveniently located to avoid blocking adjacent AC power output receptacles typically provided in an array together, such as from a standard array of wall AC power output receptacles or as provided on a "power strip," or other extension cord devices which include a rigid structure with multiple power output receptacles thereon.

Figure 3:
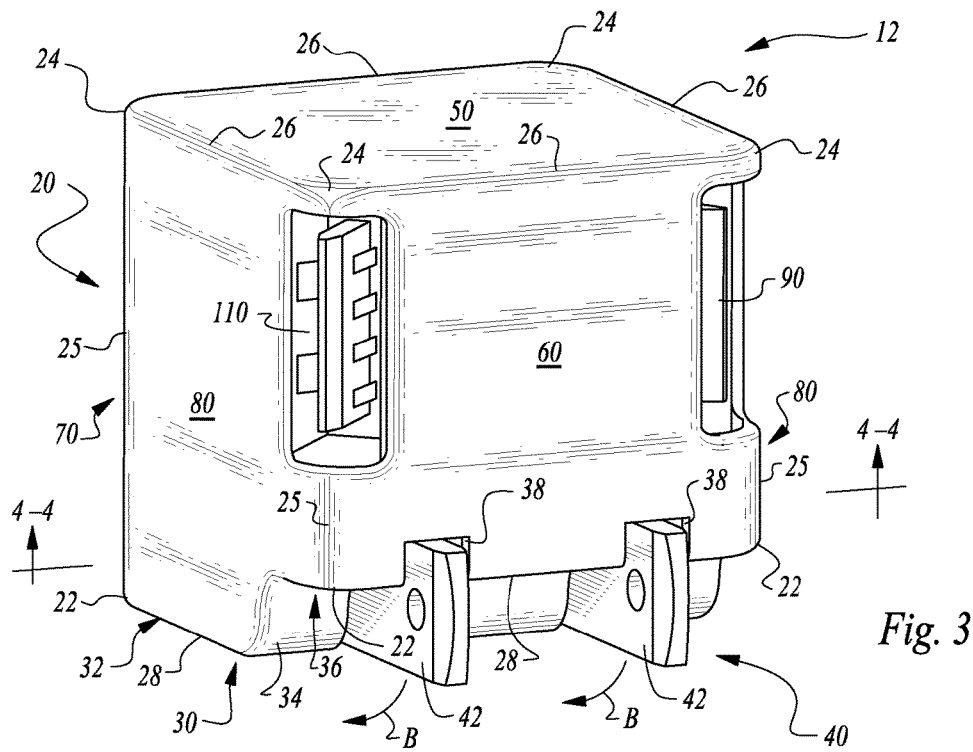
FIG. 3 is a perspective view of an alternative embodiment of that which is shown in FIG. 1, featuring two USB ports on adjacent lateral edges.

In essence, and with particular reference to FIGS. 1 and 3, basic details of the charger 10 (and alternate charger 12) are described, according to first and second embodiments of this invention. The charger 10 is contained within an outer shell/housing 20. This housing 20 includes a base wall 30 which has a male electric power plug 40 located thereon. This male electric power plug 40 is configured to connect into a standard AC power output receptacle to input power into the charger 10. A face wall 50 is provided opposite the base wall 30, preferably in an orientation parallel with the base wall 30 and spaced from the base wall 30.

A series of intermediate walls extend between the base wall 30 and face wall 50. These intermediate walls include a top wall 60 opposite a bottom wall 70 and two side walls 80 between the top wall 60 and bottom wall 70. Lateral edges 25 space the intermediate walls 60, 70, 80 from each other. A USB port 90 provides a preferred form of power outlet from the charger 10 and is located along one of the lateral edges 25.

Circuitry 100 (FIGS. 2 and 4) is located within the housing 20 to transform AC power input into DC power output, in a manner compatible with electric standard provided for various battery powered portable electronic devices. As an alternative, a second USB port 110 (FIG. 3) can be provided on a separate lateral edge 25 of the housing 20 to provide a charger 12 which can supply DC power to two separate portable electronic devices. Additional numbers of USB ports could also conceivably be provided, such as on other lateral edges 25 or conceivably on face edges 26 between the face wall 50 and the various intermediate walls 60, 70, 80. As an alternative to the USB ports 90, 110, a connected cable 120 (FIGS. 5-12) could be provided which has a form distinct from that of USB ports 90, 110 but still provides the function of delivering DC power from the housing 20 of the charger 10, 12 to a portable electronic device. Such a fixed cable or removable cable 120 charger 14 is depicted in FIGS. 5-12.

Figure 2:
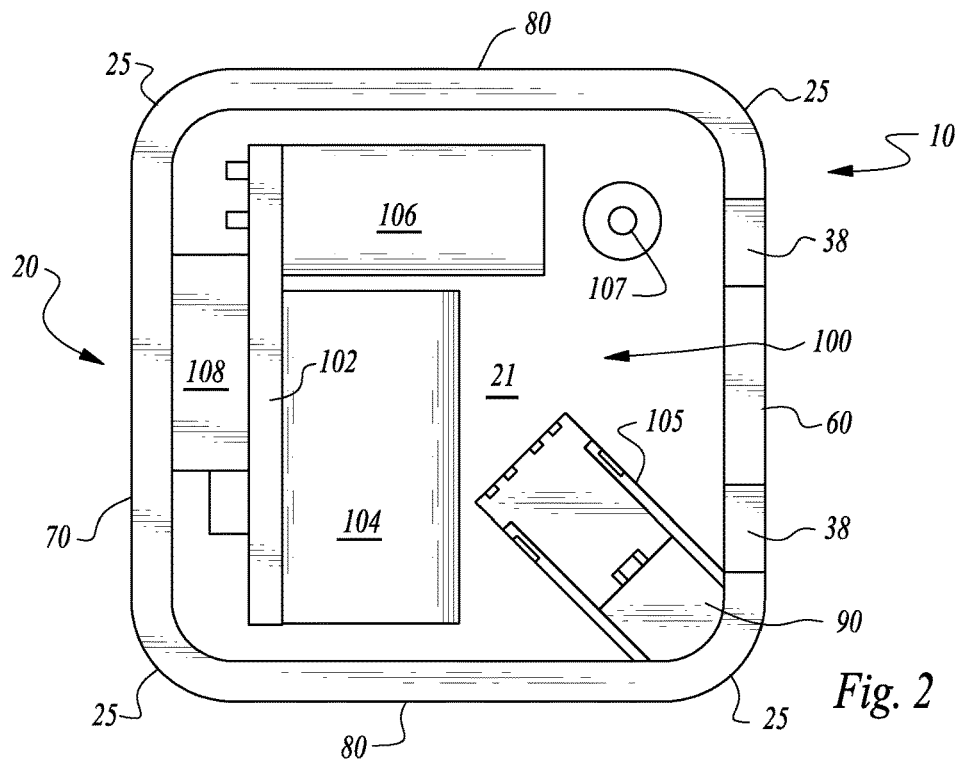
FIG. 2 is a full sectional view of that which is shown in FIG. 1, taken along lines 2-2 of FIG. 1, and revealing interior details of the charger.

More specifically, and with particular reference to FIGS. 1 and 2, basic details of the charger 10 according to this first embodiment are described. The charger 10 is enclosed within the housing 20 which isolates the circuitry 100 within the housing 20 from an exterior surface which can be handled by a user and from which a power input such as the male electric power plug 40 can extend, and to which a power outlet, such as the USB port 90, can extend.

The housing 20 has an interior 21 which contains the circuitry 100. An exterior of the housing 20 is formed by the base wall 30 opposite the face wall 50. The face wall 50 is preferably substantially parallel and spaced from the base wall 30. Intermediate walls including a top wall 60 opposite a bottom wall 70 and a pair of side walls 80 opposite each other extend from the base wall 30 to the face wall 50. Each of these walls is preferably substantially planar, except the base wall 30 preferably is somewhat more complex. Together these walls form a generally orthorhombic structure which is close to a perfect cube so that each of the walls is substantially square.

Junctions between each of these walls include corners and edges. In particular, four base corners 22 are provided at each corner of the base wall 30 and four face corners 24 are provided at each corner of the face wall 50. Face edges 26 define transitions from the face wall 50 to each of the adjacent intermediate walls 60, 70, 80. Base edges 28 define edges where the base wall 30 transitions to each of the adjacent intermediate walls 60, 70, 80. In addition, a series of lateral edges 25 are spaced between each of the intermediate walls, so that the lateral edges 25 each extend from the base wall 30 to the face wall 50.

Importantly, these lateral edges 25 provide a location for the power outlet(s). The power outlet in this embodiment of the charger 10 is in the form of a USB port 90. This port 90 has a standard configuration such as that which can receive a USB male plug therein. Most preferably this USB port 90 is at a lateral edge 25 which is between the top wall 60 and one of the side walls 80. Alternatively, the USB port 90 could be provided at one of the other lateral edges 25.

The USB port 90 has a pair of short ends spaced from each other and a pair of long ends opposite each other, with the short ends further from each other than the long ends. The short ends are preferably each located upon the lateral edge 25 where the USB port 90 is located, with each of the long edges spaced slightly from the lateral edge 25 of the charger 10. The USB port 90 is angled at an intermediate angle between the two adjacent walls 60, 80 of the lateral edge 25 in which the USB port 90 is oriented. This angle can be thought of as about 45° away from a plane in which the top wall 60 is oriented or the side wall 80 is oriented or relative to other walls adjacent to the edge in which the USB port 90 is oriented. As an alternative, angles other than 45° could be provided for the USB port 90. Most preferably, the USB port 90 is located closer to the face wall 50 than to the base wall 30. As an alternative, the USB port 90 could be provided elsewhere along the lateral edge 25 extending from the face wall 50 to the base wall 30. The USB port 90 is shown with a particular configuration but could be rotated 180° about a centerline along which a USB male plug would pass when plugging into the USB port 90, and still function effectively according to this invention.

The base wall 30 preferably includes a substantially planar plateau 32 at one portion thereof and a substantially planar secondary surface 36 at another portion thereof, with a transition slope 34 curving from the plateau 32 to the secondary surface 36. The combination of the plateau 32, slope 34 and secondary surface 36 together form the base wall 30. Preferably, each of these surfaces remain perpendicular to the two side walls 80, with the plateau 32 further from the face wall 50 and the secondary surface 36 closer to the face wall 50.

The male electric power plug 40 extends from the base wall 30 preferably through a rotary root 44 which allows prongs 42 of the plug 40 to rotate. This rotation is along arrow B between an extended orientation (FIG. 5) and a collapsed orientation (FIGS. 1 and 3). The rotary root 44 is located within the plateau 32 but adjacent to the slope 34. An offset between the plateau 32 and the secondary surface 36 is preferably similar to a height of the prongs 42 when the prongs 42 reside within slight channels 38 formed in the secondary surface 36. The rotary root 44 is positioned such that the prongs 42 do not extend substantially beyond the plateau 32 when the prongs 42 are in their collapsed position. However, the prongs 42 can be grabbed by fingers of a user where they are exposed adjacent to the secondary surface 36, so that the prongs 42 can be conveniently grasped and caused to rotate about the rotary root 44 (and along arrow B of FIGS. 1 and 3) from their collapsed orientation to their deployed orientation (FIG. 5), and vice versa.

Circuitry 100 within the housing 20 can be any of a variety of circuitry which achieve the function of transforming AC electric power into DC electric power and otherwise conditioning the DC electric power to be compatible with the USB port, cables which have USB interfaces at ends thereof and compatible with circuitry and electronics within the portable electronic device coupled to the charger 10. Typically this circuitry 100 includes a printed circuit board 102 and a transformer 104, as well as typically a capacitor 106 and a fuse 108.

A USB receptacle 105 is also wired into the circuitry 100 to allow for the power to be outputted from the circuitry 100 and from the charger 10. An LED 107 is preferably also provided within the circuitry 100 which can be visible through an LED hole 52 in the face wall 50. The circuitry 100 can be configured so that the LED 107 is illuminated when power is passing through the circuitry 100. Typically the LED 107 would be a green LED to provide the general indication of acceptable operation of the charger 10. Wires are not shown in the circuitry 100 but would generally interconnect the elements of the circuitry 100 contained within the interior 21 of the housing 20.

Figure 4:
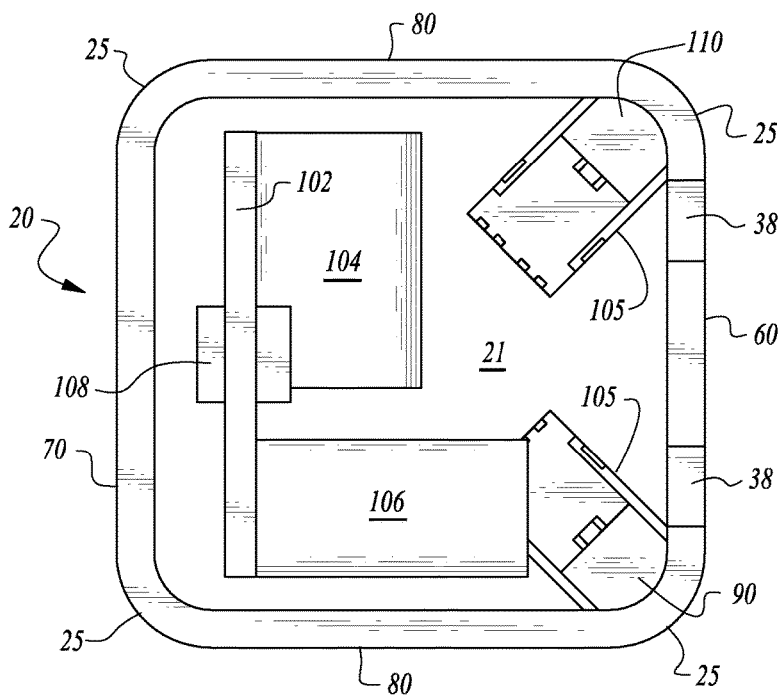
FIG. 4 is a full sectional view taken along lines 4-4 of FIG. 3.
Figure 9:
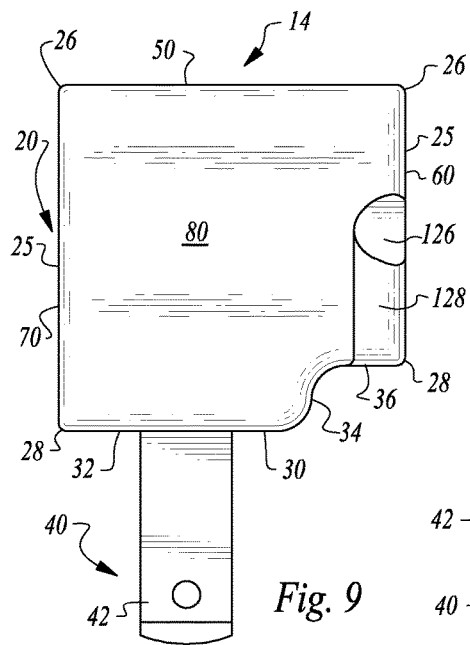
Figure 10:
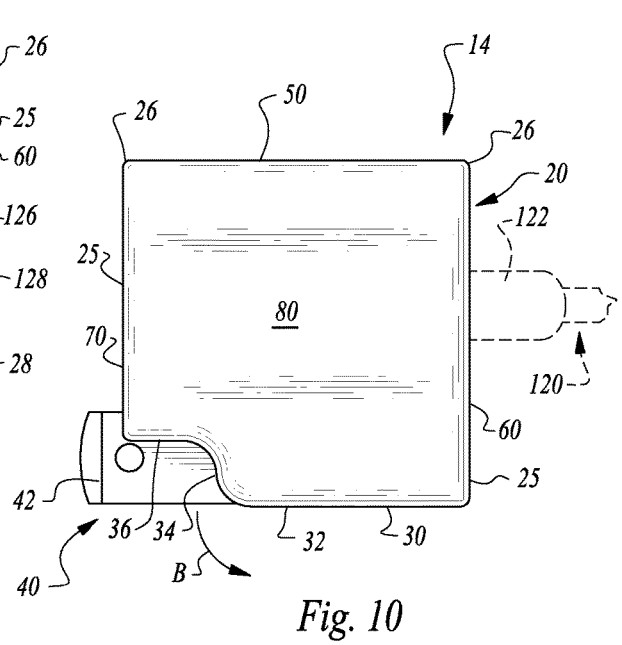
FIGS. 10-12 are further orthogonal and perspective views of that which is shown in FIG. 5, but with the prongs pivoted to a collapsed position.
Figure 11:
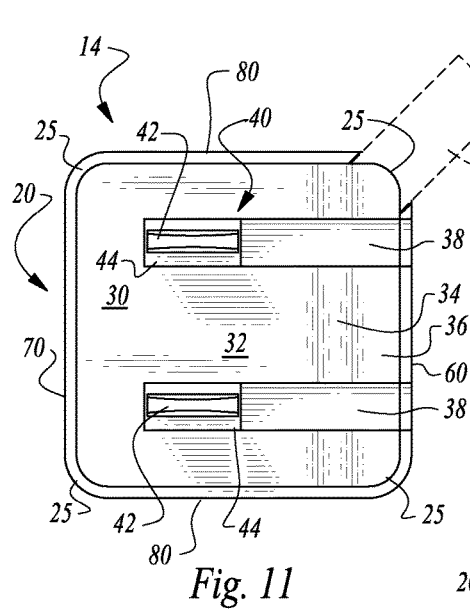
Figure 12:
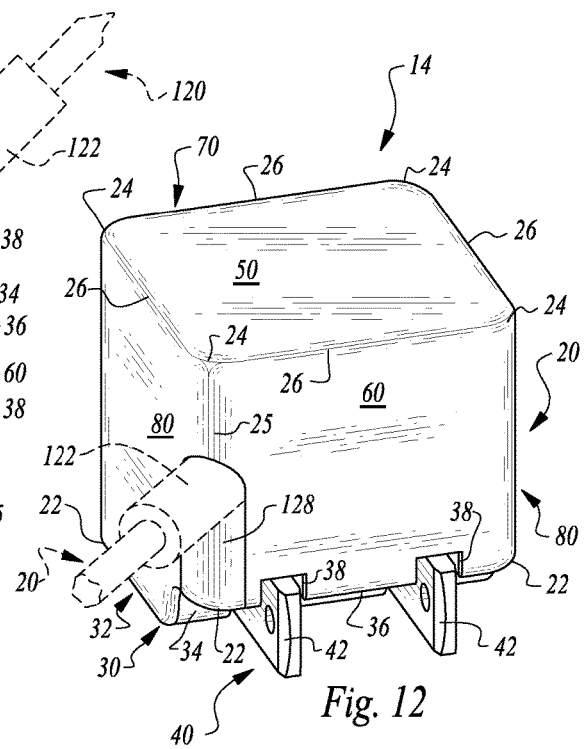
Figure 13:
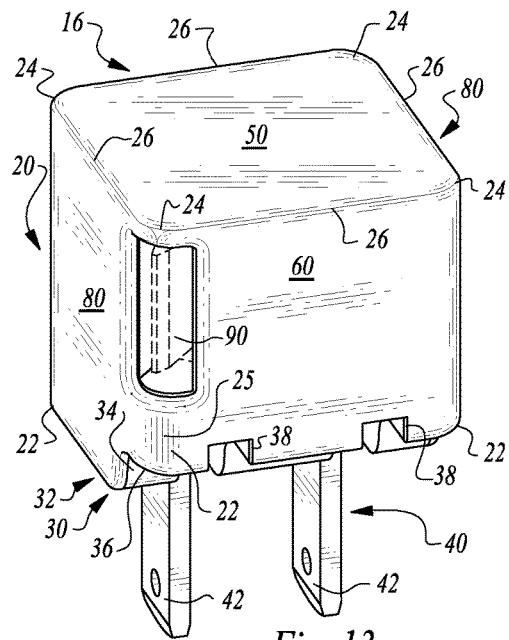
FIGS. 13-20 are views similar to those of FIGS. 5-12, but for an embodiment of the wall charger of this invention with a single USB port.
Figure 14:
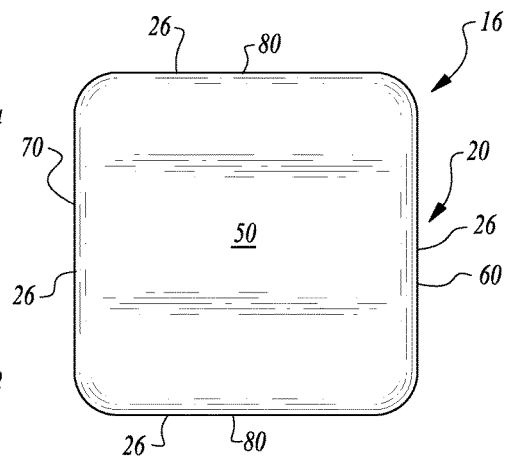
Figure 15:
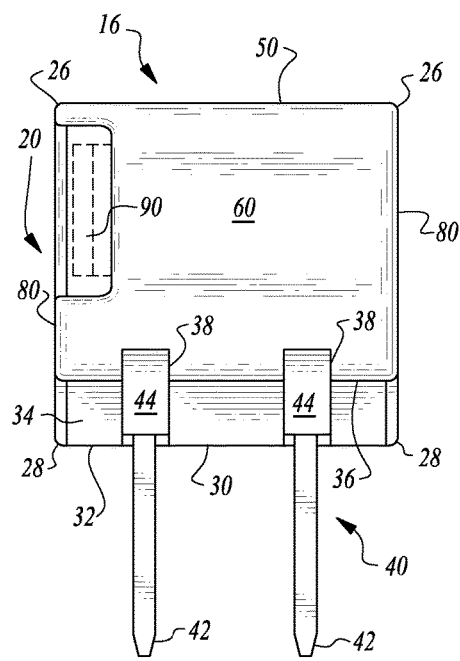
Figure 16:
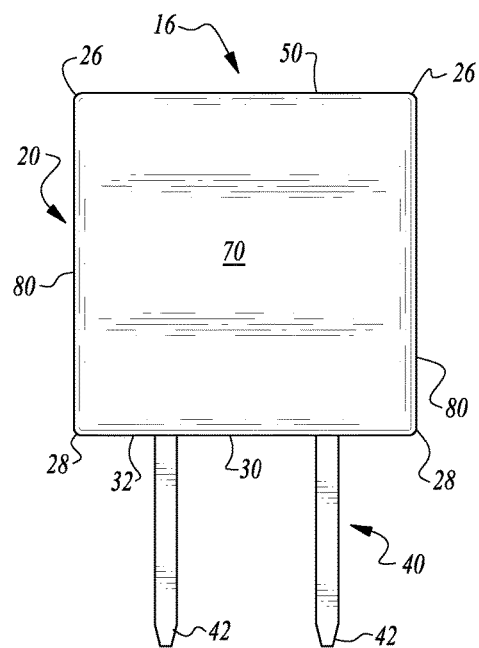
Figure 17:
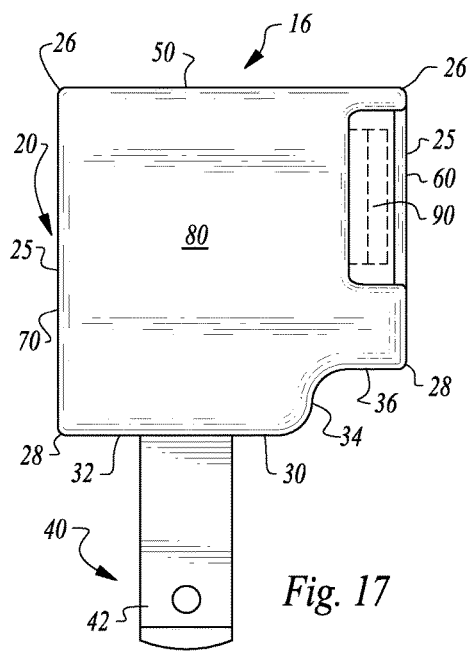
Figure 18:
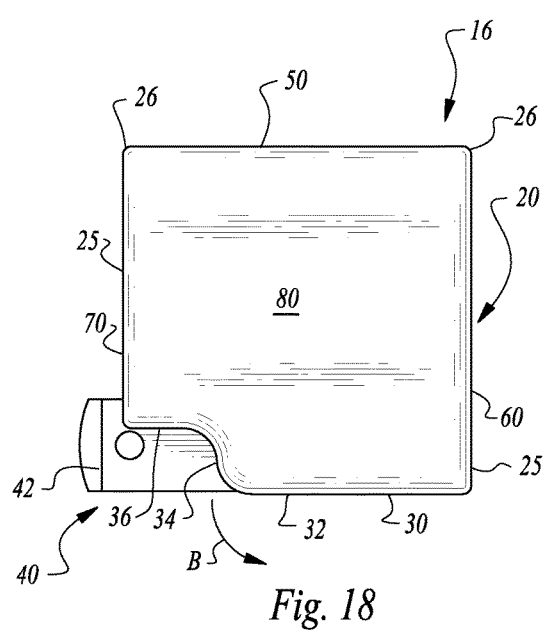
Figure 19:
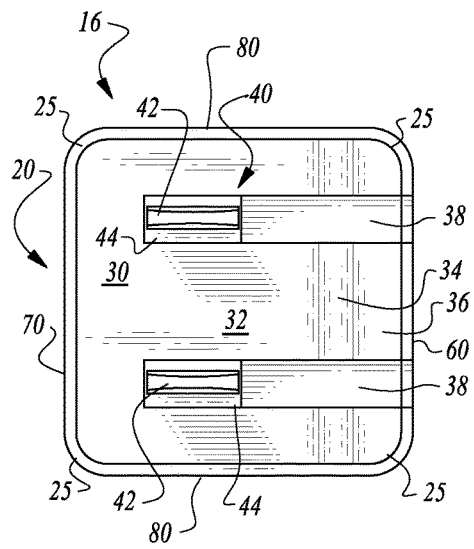
Figure 20:
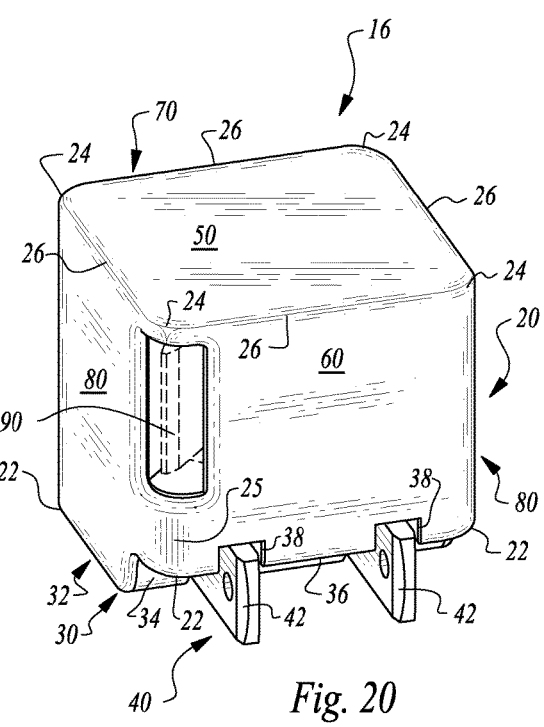
Figure 21:
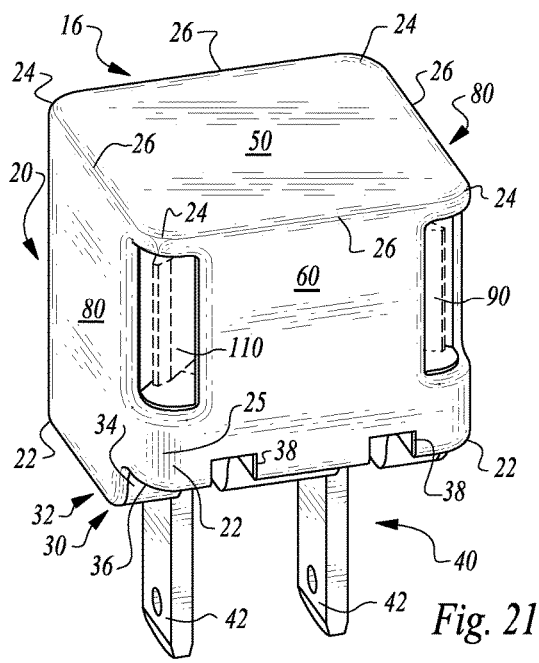
FIGS. 21-28 are various views similar to those of FIGS. 5-12, but for an embodiment of the charger of this invention featuring a pair of USB ports on adjacent lateral edges.
Figure 22:
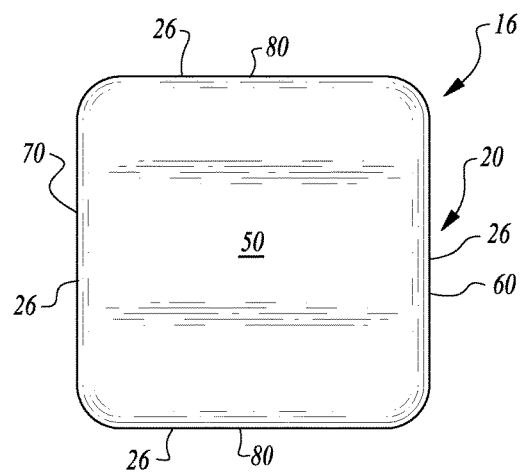
Figure 23:
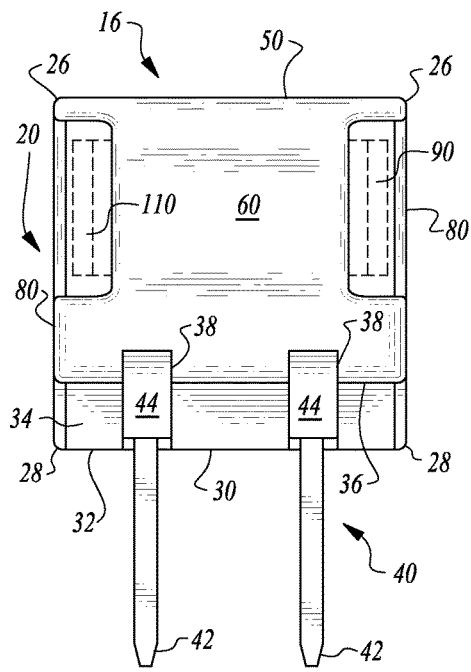
Figure 24:
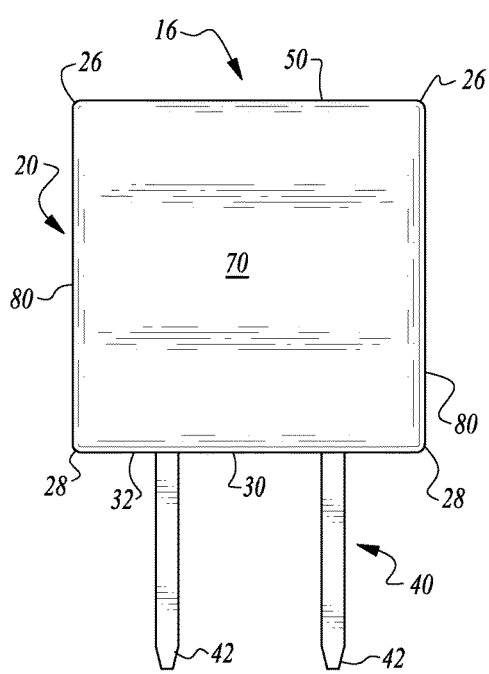
Figure 25:
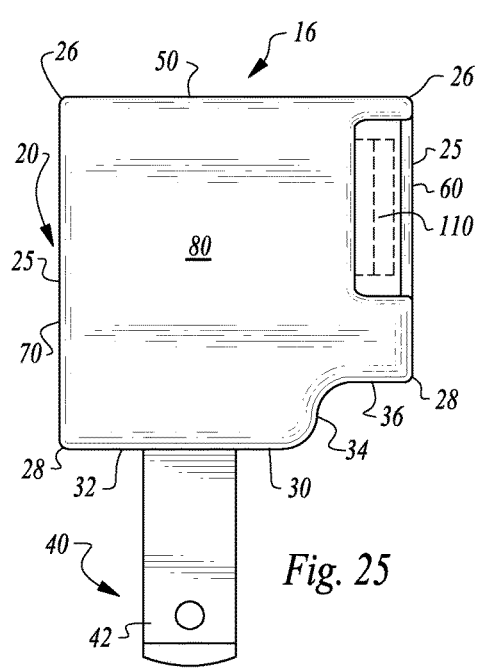
Figure 26:
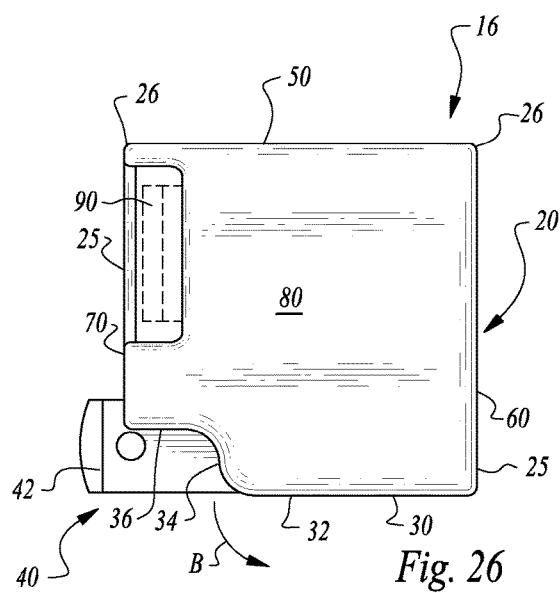
Figure 27:
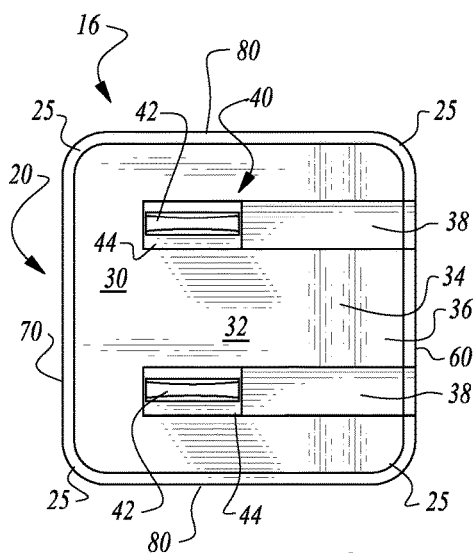
Figure 28:
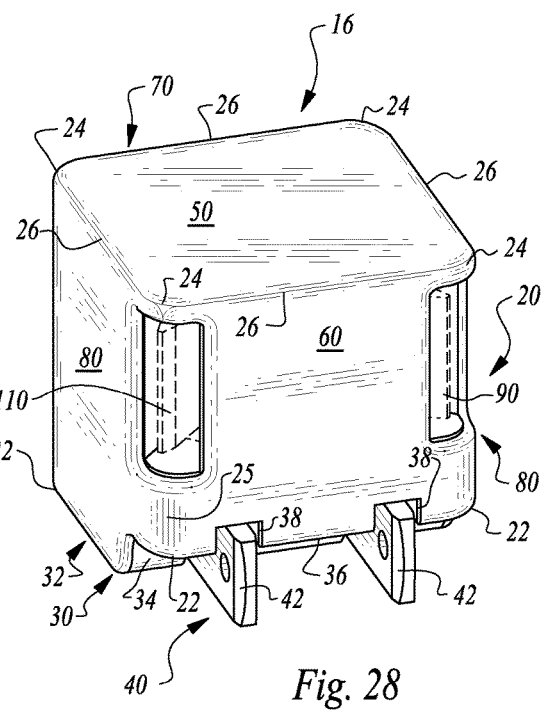

With particular reference to FIGS. 3 and 4 an alternative charger 12 is shown. This alternative charger 12 is similar to the charger 10 except that a second USB port 110 is provided along with the USB port 90. Interior circuitry within an interior 21 of the housing 20 includes an additional USB receptacle 105 and the circuitry 100 is appropriately modified to deliver power to each of the USB receptacles 105 so that the USB port 90 and the second USB port 110 can both receive a male USB plug therein and be routed to a separate portable electronic device for separate powering thereof.

The two USB ports 90, 110 are preferably on adjacent lateral edges 25. Alternatively, they could be on opposite lateral edges 25 or could be on a lateral edge 25 and on a face edge 26 or both on a face edge 26. Preferably, each of the USB ports 90, 110 extend at a 45° angle away from walls adjacent to the edges from which the ports 90, 110 extend. The diagonal angle of these ports 90, 110 is preferably 45° in each case.

As a further alternative to the charger 12, it is conceivable that three or four USB ports total could be provided, such as with one USB port on each of the lateral edges 25. If USB ports were provided on the face edges 26, a total of up to eight USB ports could conceivably be provided, with four USB ports on lateral edges 25 and four USB ports on face edges 26. Circuitry 100 would merely be modified to include additional USB receptacles 105 at the required location and wired into the circuitry 100 to deliver power to each of the USB receptacles 105.

With particular reference to FIGS. 5-12, a further embodiment of this invention is in the form of a charger 14 which replaces the USB port 90 (FIGS. 1 and 2) with a connected cable 102 which mounts to the housing 20 through a strain relief 122 fitting within a hole 124 in the housing 20. A slot 128 is preferably provided adjacent to this hole 124 such as shown in FIGS. 5 and 7. A connected cable 120 is shown in broken lines in these figures and could be removable or fixed to the housing 20. Most typically, the cable 120 would be fixed. If the cable 120 were removable it would include some prong shape which would allow for electrical interconnection within an interior receiver. With the cable 120 extending from the housing 20, the housing 20 and cable 120 would always remain together. An end of the cable 120 opposite the housing 20 would be provided with a prong or other coupling which would allow it to be connected to a portable electronic device to supply power to the portable electronic device.

With particular reference to FIGS. 13-20, various additional views are provided for the charger 16, but with the USB port 90 on a different lateral edge 25 than that depicted in FIGS. 1 and 2. FIGS. 21-28 provide further views of the charger 12 of FIGS. 3 and 4.

In use and operation, when one is to charge a portable electronic device often a charging cable is provided which has a first end which couples to the portable electronic device and a second end with a male USB plug thereon which can plug to a computer for charging (and data transfer). A charger such as the charger 10 is provided with the USB port such as the USB port 90 so that the second end of the charging cable can be coupled to this charger to provide DC electric power. The charger includes a transformer therein and prongs which plug into AC power output receptacles.

Uniquely with this invention, when the charger 10, 12, 14, 16 is plugged into one of these AC power output receptacles, all other power output receptacles which are commonly provided in an array adjacent to the first power output receptacle into which the charger 10, 12, 14 is plugged, are left completely unobstructed. This is because the USB port 90 or other power outlet from the housing 20 of the charger 10 is located on a lateral edge 25 (or perhaps a face edge 26), leaving adjacent AC power output receptacles unobstructed and available for other uses. The charger 10 thus maximizes the usefulness of existing AC power output receptacles. Furthermore, when multiple USB ports 90, 110 are provided on the charger 12, multiple portable electronic devices can be simultaneously charged utilizing a single power output receptacle. When the charger 10 is not in use, the prongs 42 of the male electric power plug 40 can be rotated to a collapsed position to cause the charger 10 to have a smaller size for more convenient storage.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. An electric power charger for a portable electronic device, comprising in combination:
    a power input, said power input including at least two prongs spaced from each other and extending parallel with each other, said prongs formed of electrically conductive material;
    a power outlet;
    a housing having said at least two prongs extending therefrom and said power outlet thereon;
    said housing containing circuitry which includes a transformer that converts AC electric power entering said circuitry through said power input into DC electric power exiting said power outlet;
    said housing having a base wall parallel and opposite a face wall;
    said housing having at least four intermediate walls extending from said base wall to said face wall;
    said housing having lateral edges between said intermediate walls, said lateral edges extending at least partially from said base wall to said face wall;
    said power outlet located on one of said lateral edges; and
    wherein said power outlet is oriented extending diagonally relative to intermediate walls adjacent to said lateral edge from which said power outlet extends.

2. The charger of claim 1 wherein said power outlet includes a USB port.

3. The charger of claim 2 wherein said power outlet includes a pair of separate USB ports located on separate lateral edges of said housing.

4. The charger of claim 2 wherein said USB port is an elongate receptacle having a long dimension and a short dimension opposite said long dimension, said long dimension of said USB port having opposite ends spaced along said lateral edge with one of said opposite ends closer to said face wall and another of said opposite ends closer to said base wall.

5. The charger of claim 2 wherein said power outlet includes a cord extending from said housing at one of said lateral edges, said cord coupled to said housing through a strain relief having a central axis oriented diagonal with said intermediate walls adjacent to said lateral edge from which said cord extends.

6. The charger of claim 2 wherein said power outlet extends at a 45° angle away from planes in which said intermediate walls are oriented.

7. An electric power charger for a portable electronic device, comprising in combination:
- a power input, said power input including at least two prongs spaced from each other and extending parallel with each other, said prongs formed of electrically conductive material;
- a power outlet;
- a housing having said at least two prongs extending therefrom and said power outlet thereon;
- said housing containing circuitry which includes a transformer that converts AC electric power entering said circuitry through said power input into DC electric power exiting said power outlet;
- said housing having a base wall parallel and opposite a face wall;
- said housing having at least four intermediate walls extending from said base wall to said face wall;
- said housing having lateral edges between said intermediate walls, said lateral edges extending at least partially from said base wall to said face wall;
- said power outlet located on one of said lateral edges;
- wherein said prongs are pivotably attached to said housing in a manner maintaining electric connection when said prongs pivot to a deployed position extending away from said base wall; and
- wherein said base wall includes a plateau surface and a secondary surface oriented in separate planes with a slope connecting said plateau surface to said secondary surface, said prongs extending through said slope and outside of said secondary surface when said prongs are collapsed against said base wall, said prongs extending from a rotary root rotatably supported within said plateau, said rotary root interconnecting said prongs together such that said prongs pivot together.

8. A wall charger, comprising in combination:
- a pair of electrically conductive prongs extending from a base wall;
- a face wall spaced from said base wall;
- four side walls extending between said base wall and said face wall with said side walls perpendicular to said base wall and with lateral edges between adjacent said side walls;
- a power outlet located at one of said lateral edges, said power outlet configured to route power to a portable electronic device; and
- wherein said power outlet is oriented extending diagonally relative to side walls adjacent to said lateral edge in which said power outlet is located.

9. The wall charger of claim 8 wherein said power outlet includes a USB port.

10. The wall charger of claim 9 wherein said power outlet includes a pair of separate USB ports located on separate lateral edges of said housing.

11. The wall charger of claim 9 wherein said USB port is an elongate receptacle having a long dimension and a short dimension opposite said long dimension, said long dimension of said USB port having opposite ends spaced along said lateral edge with one of said opposite ends closer to said face wall and another of said opposite ends closer to said base wall.

12. The wall charger of claim 8 wherein said power outlet includes a cord extending from said housing at one of said lateral edges, said cord coupled to said housing through a strain relief having a central axis oriented diagonal with said side walls adjacent to said lateral edge from which said cord extends.

13. The wall charger of claim 8 wherein said power outlet extends at a 45° angle away from planes in which said side walls are oriented.

14. An electric power charger for a portable electronic device, comprising in combination:
- a power input, said power input including at least two prongs spaced from each other and extending parallel with each other, said prongs formed of electrically conductive material;
- a power outlet;
- a housing having said at least two prongs extending therefrom and said power outlet thereon;
- said housing containing circuitry which includes a transformer that converts AC electric power entering said circuitry through said power input into DC electric power exiting said power outlet;
- said housing having a base wall parallel and opposite a face wall;
- said housing having at least four intermediate walls extending from said base wall to said face wall;
- said housing having lateral edges between said intermediate walls, said lateral edges extending at least partially from said base wall to said face wall;
- said power outlet located on one of said lateral edges;
- wherein said prongs are pivotably attached to said housing in a manner maintaining electric connection when said prongs pivot to a deployed position extending away from said base wall; and
- wherein said base wall includes a plateau surface and a secondary surface oriented in separate planes with a slope connecting said plateau surface to said secondary surface, said prongs extending through said slope and outside of said secondary surface when said prongs are collapsed against said base wall, said prongs extending from a rotary root rotatably supported within said plateau, said rotary root interconnecting said prongs together such that said prongs pivot together.

* * * * *